J. H. Mills,
Elevator.
No. 85,952.
Patented Jan. 12, 1869.
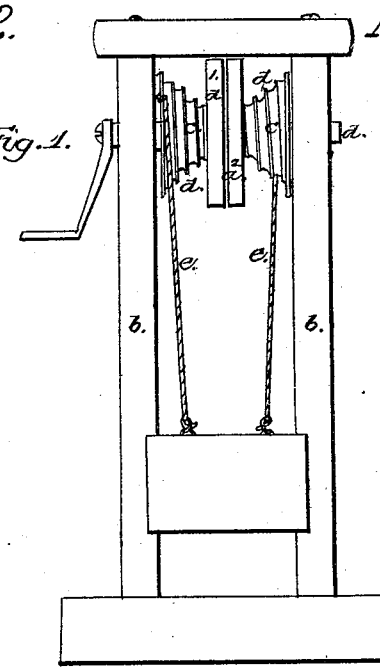
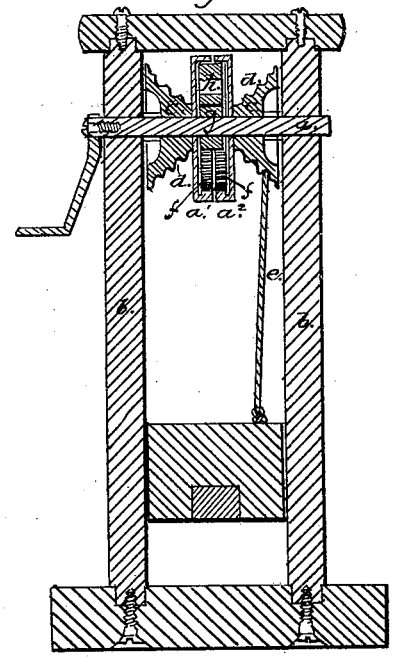
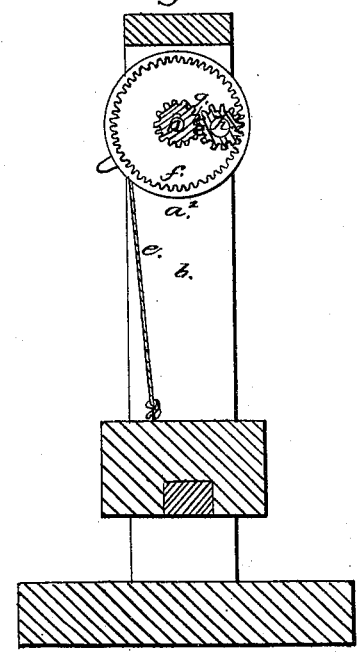
Witnesses:
Inventor:
J. H. Mills

United States Patent Office.

JOHN H. MILLS, OF BOSTON, MASSACHUSETTS.

Letters Patent No. 85,952, dated January 19, 1869.

HOISTING-APPARATUS.

The Schedule referred to in these Letters Patent and making part of the same.

*To all to whom these presents shall come:*

Be it known that I, JOHN H. MILLS, of Boston, in the county of Suffolk, and State of Massachusetts, have made an invention of a new and useful Hoisting or Power-Press Mechanism; and do hereby declare the following to be a full, clear, and exact description thereof, due reference being had to the accompanying drawings, making part of this specification, and in which—

Figure 1 is a side elevation.

Figures 2 and 3 are vertical sections.

My present invention is intended for use in localities where great power is sought rather than speed of movement, and is particularly applicable to hay, cotton, and other presses, as well as for hoisting heavy bodies, &c.

The invention consists in the employment of two pulleys or disks, arranged loosely upon a shaft, and placed face to face, and having differential ring-gears formed upon their inner peripheries, such gears operating in connection with two pinions, one of which is fixed to the shaft before mentioned, and the other being a rolling or free pinion, the said pinions driving the gears before mentioned, and the arrangement of the whole being such that, during one revolution of the rolling pinion about the circumference of the ring-gears, one gear and its pulley is caused to travel at an increased rate of speed from that of its fellow, this speed being directly dependent upon the increase of the number of teeth of one gear over that of the other.

In the drawings above mentioned as illustrating my invention—

$a$ denotes a horizontal shaft, properly supported within an upright frame, $b\ b$.

Upon the shaft are disposed loosely two conical pulleys, $c\ c$, of equal size, or thereabouts, having helical grooves, $d\ d$, cut in their outer periphery for reception of two ropes or chains, $e\ e$, which are secured at one end to the larger end of such pulleys, the ends of such rope or chain being attached to an elevator-carriage, or any object to be raised or lowered.

The smaller ends of the pulleys, or those contiguous to one another, are furnished with recessed heads or barrels, $a^1\ a^2$, and upon the peripheries of these heads or barrels continuous or ring-gears $f\ f$ are formed, of differential numbers of teeth, in the present instance one being composed of forty-nine teeth, and the other, of fifty teeth.

A pinion, $g$, is fixed to and revolves concentric with the shaft $a$, while a second loose or rolling pinion, $h$, is disposed between the said pinion $g$ and the ring-gears $f\ f$ before mentioned.

The revolution of the shaft $a$ causes a like revolution of the pinion $g$, which in turn causes a revolution of the loose or independent pinion $h$. This pinion $h$ meshes into the ring-gears $f\ f$, and causes a rotation of them and their barrels and pulleys about the shaft $a$, but as the teeth of these gears are different in number, one pulley must separate from or be driven at different speed from its neighbor, thus, for every revolution of the loose pinion about the circumference of such gear, giving a slight rotary motion of one pulley at an accelerated speed over that of the other, and by this means gain an immense power, for the purpose of winding the ropes about the peripheries of the pulleys, and, as a consequence, raise the weight or load upon the carriage to which the ropes are attached, or, in case of a press, to force the head of the press toward its opposite end.

It will be evident that the less the difference in the number of the teeth in the two ring-gears, other conditions being equal, the greater will be the power acquired, but a consequent loss of speed of movement.

Again, the smaller the pinions affixed to the shaft $a$, in comparison with the rolling pinion, the greater will be the power of the apparatus.

These conditions are to be varied according to circumstances, or to individual applications of the principles of my invention.

The advantages of the conical form of the pulleys are best seen in the application of the device to a press, as the larger ends of the pulleys, as the ropes are wound round them, operate at first with much greater speed than the smaller ends, which completes the process of pressing the material, with a great accession of power.

I claim the combination and arrangement of the ring-gears $f\ f$, as formed upon the pulleys $c\ c$, and operating in connection with the pinions $h$ and $g$, the whole being fixed to or operating upon the shaft $a$, and connected with the press-head or carriage by ropes or chains $e\ e$, and operating as herein shown and described.

JOHN H. MILLS.

Witnesses:
FRED. CURTIS,
EDWARD GRIFFITH.